(12) United States Patent
Herzog

(10) Patent No.: US 7,543,725 B2
(45) Date of Patent: Jun. 9, 2009

(54) VIBRATION DAMPING SUPPORT STRAP

(76) Inventor: Harry Herzog, 115 - 150th Pl. SE., Lynnwood, WA (US) 98037

(*) Notice: Subject to any disclaimer, the term of this patent is extended or adjusted under 35 U.S.C. 154(b) by 66 days.

(21) Appl. No.: 10/656,397

(22) Filed: Sep. 5, 2003

(65) Prior Publication Data

US 2005/0051583 A1 Mar. 10, 2005

(51) Int. Cl.
A44C 5/00 (2006.01)
B65G 7/12 (2006.01)
A47L 5/22 (2006.01)

(52) U.S. Cl. .................. 224/576; 224/221; 294/25; 15/405

(58) Field of Classification Search .......... 224/917, 224/917.5, 221, 205, 219, 222, 250, 220; 294/150, 25, 58; 24/3.2, 17 A, 306, 442, 24/16 R; 128/882; 15/405
See application file for complete search history.

(56) References Cited

U.S. PATENT DOCUMENTS

| | | | | |
|---|---|---|---|---|
| 712,843 A * | 11/1902 | Paul | ............................ | 173/30 |
| 774,143 A * | 11/1904 | Adams | ....................... | 224/220 |
| 2,352,856 A * | 7/1944 | Morehouse | ............... | 248/74.3 |
| 2,504,880 A * | 4/1950 | Rittenhouse | ............... | 408/124 |
| 2,638,130 A * | 5/1953 | Posson | ....................... | 139/421 |
| 3,711,868 A * | 1/1973 | Kristof | ......................... | 2/237 |
| 3,947,927 A * | 4/1976 | Rosenthal | ..................... | 24/306 |
| 4,315,641 A * | 2/1982 | Larsen | ........................ | 280/822 |
| 4,422,455 A * | 12/1983 | Olsen | ......................... | 128/878 |
| 4,657,251 A * | 4/1987 | Larsen | ........................ | 473/62 |
| 4,856,149 A * | 8/1989 | Brame | ......................... | 24/3.2 |
| 4,862,563 A | 9/1989 | Flynn | ........................... | 24/442 |
| 4,909,514 A | 3/1990 | Tano | ....................... | 273/148 B |
| 4,924,571 A * | 5/1990 | Albertson | ..................... | 30/121 |
| 4,960,280 A * | 10/1990 | Corder, Jr. | ................... | 473/212 |
| 4,991,234 A | 2/1991 | Greenberg | ..................... | 2/170 |
| 5,076,288 A | 12/1991 | Millard et al. | .............. | 128/869 |
| 5,082,156 A * | 1/1992 | Braun | ......................... | 224/220 |
| 5,110,023 A * | 5/1992 | Colin | ......................... | 224/620 |
| 5,159,775 A * | 11/1992 | Sutula, Jr. | .................... | 43/21.2 |
| 5,214,874 A | 6/1993 | Faulkner | ..................... | 43/25.2 |
| 5,228,610 A * | 7/1993 | Spence | ........................ | 224/267 |
| D351,336 S * | 10/1994 | Dean et al. | ................... | D8/394 |
| D353,262 S * | 12/1994 | Cantavespre et al. | ......... | D3/221 |
| 5,433,359 A | 7/1995 | Flowers | ....................... | 224/222 |
| 5,451,085 A * | 9/1995 | Wagner | ....................... | 294/58 |
| 5,529,357 A | 6/1996 | Hoffman | ...................... | 294/58 |
| 5,582,337 A * | 12/1996 | McPherson et al. | ......... | 224/660 |
| D377,862 S * | 2/1997 | Moore | ......................... | D3/228 |
| 5,601,356 A | 2/1997 | McWilliams | ................ | 362/103 |
| 5,661,960 A | 9/1997 | Smith et al. | .................. | 56/12.7 |
| 5,716,087 A * | 2/1998 | Backich et al. | ............... | 294/55 |

(Continued)

Primary Examiner—Nathan J Newhouse
Assistant Examiner—Justin M Larson
(74) Attorney, Agent, or Firm—Seed IP Law Group PLLC

(57) ABSTRACT

A support for use with a power tool includes first and second straps. First and second ends of the first strap couple together to form an adjustable first loop. The first strap also includes an elastomeric gripping surface affixed to the inner surface of the first loop. The second strap includes a first end attached to the first strap at a point in a middle region of the first strap, and a second end configured to couple to the first strap to form an adjustable second loop. The second strap includes a resilient member configured to dampen vibrations transmitted by the support.

10 Claims, 4 Drawing Sheets

U.S. PATENT DOCUMENTS

| | | | |
|---|---|---|---|
| 5,809,614 A | 9/1998 | Kretser, Jr. | 16/114 R |
| 5,910,004 A * | 6/1999 | Antosh | 43/21.2 |
| 5,938,548 A * | 8/1999 | Upshaw | 473/453 |
| 5,950,889 A | 9/1999 | Feldman, Jr. | 224/259 |
| 6,029,321 A * | 2/2000 | Fisher | 24/306 |
| 6,050,626 A * | 4/2000 | Dudley | 294/61 |
| 6,082,795 A * | 7/2000 | Fornelli | 294/58 |
| 6,138,882 A * | 10/2000 | Buettner | 224/250 |
| 6,234,372 B1 * | 5/2001 | Rivera | 224/536 |
| 6,269,990 B1 | 8/2001 | Gray | 224/200 |
| 6,598,266 B1 * | 7/2003 | Elliott | 16/430 |
| 6,732,411 B2 * | 5/2004 | Vidal | 16/430 |
| 6,773,366 B2 * | 8/2004 | Gray | 473/458 |
| 7,017,236 B2 * | 3/2006 | Vidal | 16/430 |
| 2001/0022161 A1 * | 9/2001 | Macedo et al. | 119/796 |
| 2002/0174511 A1 * | 11/2002 | Iida et al. | 15/405 |
| 2004/0007887 A1 * | 1/2004 | Elliott | 294/58 |
| 2004/0084489 A1 * | 5/2004 | Murphey et al. | 224/221 |

* cited by examiner

VIBRATION DAMPING SUPPORT STRAP

BACKGROUND OF THE INVENTION

1. Field of the Invention

The present invention relates generally to the field of power tools, and specifically to the field of vibration damping devices and support straps for power tools.

2. Description of the Related Art

In the landscaping and gardening industries, power tools are preferred over hand tools because of the increase in efficiency and productivity. Gasoline power tools, although more expensive to operate, are generally preferred over electrical tools because of the added mobility they provide, and because electrical power hook ups are not always readily available to a landscape operator.

FIG. 1 illustrates a power tool commonly used by landscapers. A leaf blower 100 includes a gasoline-powered motor 106 coupled to an impeller fan 108. The motor 106 and fan 108 are attached to a backpack frame 116, which is worn by an operator 110. The blower 100 includes a flexible section of tubing 118, which is coupled at one end to an output of the fan 108 and at the other end to an elongated rigid tube 102, which terminates in a nozzle 120. The nozzle 120 is generally interchangeable, with a variety of nozzle shapes available. A handle 104 is adjustably clamped to the rigid section of tubing 102 to allow the operator 110 to control the position of the nozzle 120. In some cases, the handle 104 includes throttle and engine cut-off controls. In other cases, no handle is provided.

When the leaf blower 100 is correctly positioned on the operator's back, the flexible section of tubing 118 is positioned under or slightly behind the elbow of the operator 110. The impeller fan 108 drives a stream of air at high velocity through the flexible and rigid tubes 118, 102, to be forced out the nozzle 120 in a focused stream. The operator 110 grips the handle 104 in his right hand 114 and, by moving his forearm, selectively positions the nozzle 120 to direct the stream of air. In the case where there is no handle provided, the operator 110 grips the rigid section of tube 102 to direct the stream of air. The operator 110 directs the focused stream of air to move leaves, grass clippings, or other organic refuse as required. A blower such as that illustrated in FIG. 1 may also be used as a power broom to sweep large surfaces, to move and collect litter, or to move light deposits of snow.

Because of the force of the air exiting the nozzle 120, the operator 110 is required to maintain a constant and strong grip on the handle 104 to direct the stream of air and to prevent the tube 102 and nozzle 120 from flying out of control. In gripping the handle, the operator's lower forearm muscles, which control the fingers, hand, and wrist, are in constant tension. Depending on the configuration of the blower in use, the wrist of the operator may be hyper-extended or otherwise awkwardly positioned as well.

A landscape worker may be required to operate such a device daily for many hours at a time. During operation, vibration of a significant amplitude is transmitted from the motor 106 and the fan 108 through the flexible section of tubing 118 into the rigid tube 102 and into the handle 104. Because the operator is required to grip the handle 104 with some force in order to direct and control the air stream passing out of the nozzle 120, there is a high degree of coupling between the handle 104 of the blower 100 and the hand 114 and arm 112 of the operator 110. This high degree of coupling permits the transmission of vibration from the tube 102 and the handle 104 to the hand 114 and arm 112 of the operator 110.

A significant problem for many professional landscapers is the effect of long term exposure to the vibration of tools like leaf blowers, grass trimmers, and brush cutters.

Recent research has linked certain occupational injuries with long-term exposure to vibrations caused by vibrating tools such as the leaf blower 100 of FIG. 1. As a class, these occupational injuries are referred to as vibration syndrome. Vibration syndrome includes such injuries as carpel tunnel syndrome and Raynaud's phenomenon.

Carpel tunnel syndrome involves the entrapment of the median nerve as it passes through the carpel tunnel located in the wrist. Compression of the nerve in the tunnel produces numbness, tingling, and burning sensations in one or more of the fingers of that hand. Carpel tunnel syndrome is associated with occupations that required repeated forceful, awkward wrist positions and the use of vibrating power tools.

Raynaud's phenomenon is characterized in its early stages by persistent tingling or numbness in the fingers. More advanced stages include blanching of a fingertip with or without tingling and numbness, blanching of one or more fingers beyond the tips, and extensive blanching of the fingers and the hand. Over time, Raynaud's phenomenon may result in decreased hand and arm muscle strength, and may cause persistent numbness and cold sensitivity. Raynaud's phenomenon is associated with extended exposure to hand-arm vibration such as from vibrating power tools.

There are several factors that will increase the risk of incurring vibration syndrome injuries: vibration frequency, vibration magnitude, exposure time, awkward and static postures, temperature, and tool design.

BRIEF SUMMARY OF THE INVENTION

According to an embodiment of the invention, a support for use with a power tool is provided, including first and second straps. The first strap includes first and second ends, the first end configured to couple to the second end to form an adjustable loop. The first strap also includes an elastomeric gripping surface affixed to a side of the first strap such that, when the strap is formed into a loop, the elastomeric gripping surface is on the inner surface of the loop. The second strap includes a first end attached to the first strap at a point in a middle region of the first strap, and a second end configured to couple to the first strap to form an adjustable second loop.

The first strap may be formed from webbing material while the gripping surface may be formed by a plurality of elastomeric threads interwoven into the webbing material of the first strap.

The second strap may include a resilient member affixed to an inner surface thereof configured to dampen vibrations transmitted by the support.

According to another embodiment of the invention, a support for use with a power landscaping tool is provided, including a buckle, a first strap having first and second ends, the first end configured to pass through a first side of the buckle and couple to the second end to form an adjustable first loop, and a second strap having a first end attached to the first strap at a point in a middle region of the first strap, and a second end configured to pass through a second side of the buckle and couple to itself to form a second loop.

According to an additional embodiment of the invention, a landscape tool for use by an operator is provided, comprising a motor, an elongated working member coupled to the motor, and a strap coupled to the elongated member and configured to be adjustably coupled to the operator's forearm. The landscape tool may further comprise a resilient vibration-damping member coupled to an inner surface of the strap and positioned to make contact with the operator's forearm.

According to an embodiment, the strap comprises first and second loops, with the first loop affixed to the elongated working member and the second loop configured to be adjustably coupled to the operator's forearm. The first loop may include an elastomeric gripping member coupled to an inner surface thereof to hold the first strap in position on the elongated working member.

According to an alternate embodiment, the strap comprises a loop coupled to the elongated working member and configured to be adjustably coupled to the operator's forearm. The loop may be coupled to the elongated working member by a clip configured to mate with a coupling member affixed to the elongated working member.

Among other alternatives, the landscape tool may be a leaf blower, a grass trimmer, or a pressure washer.

An additional embodiment of the invention provides a method of operation, including affixing a strap to an elongated member of a power tool, adjustably affixing the strap to an operator's forearm, applying power to the power tool, dampening vibrations transmitted from the power tool to the operator's forearm, and directing the elongated member by movements of the operator's forearm.

DETAILED DESCRIPTION OF THE INVENTION

Figure 1:
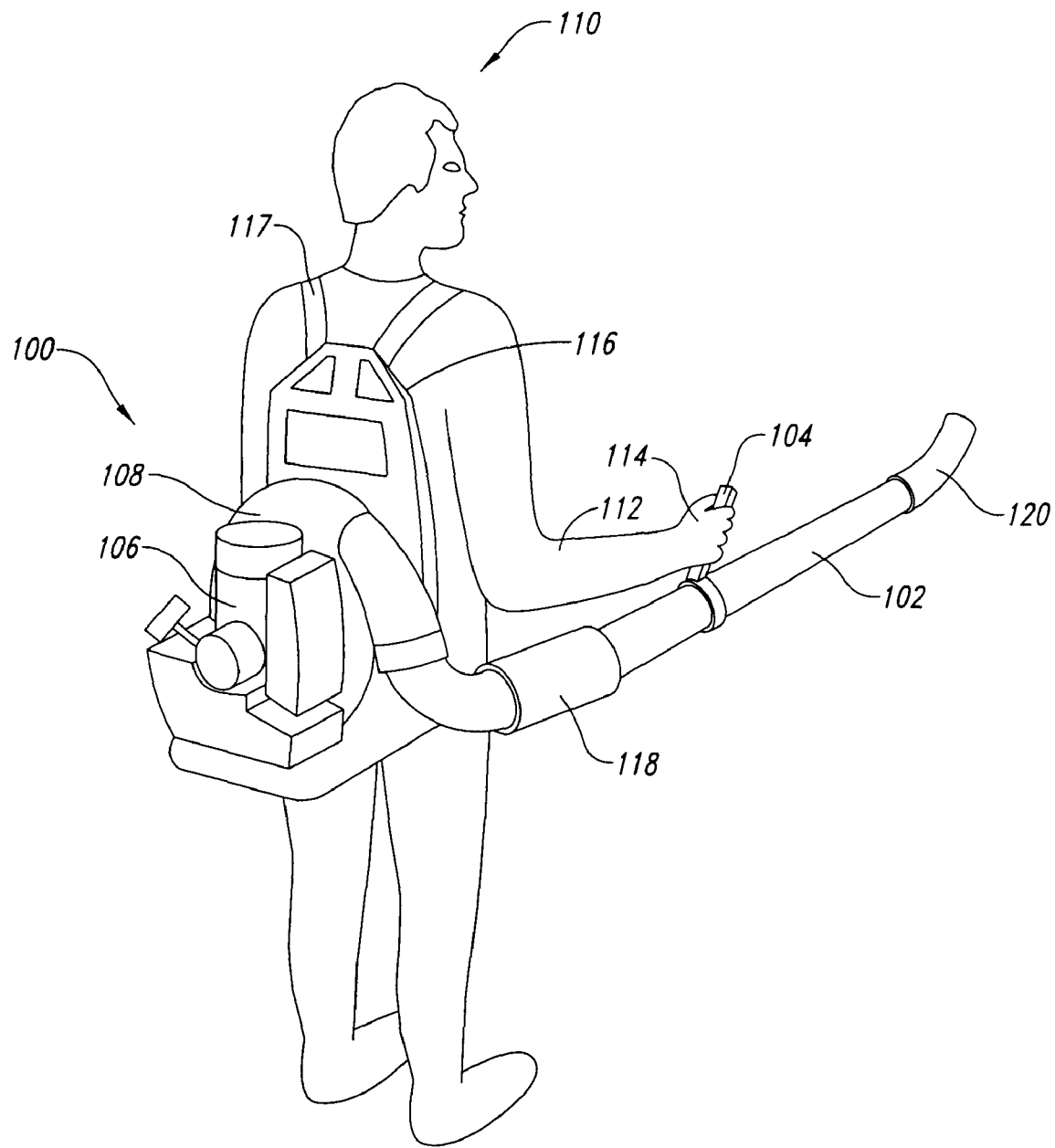
FIG. 1 shows an operator using a leaf blower according to a known embodiment.
Figure 2:
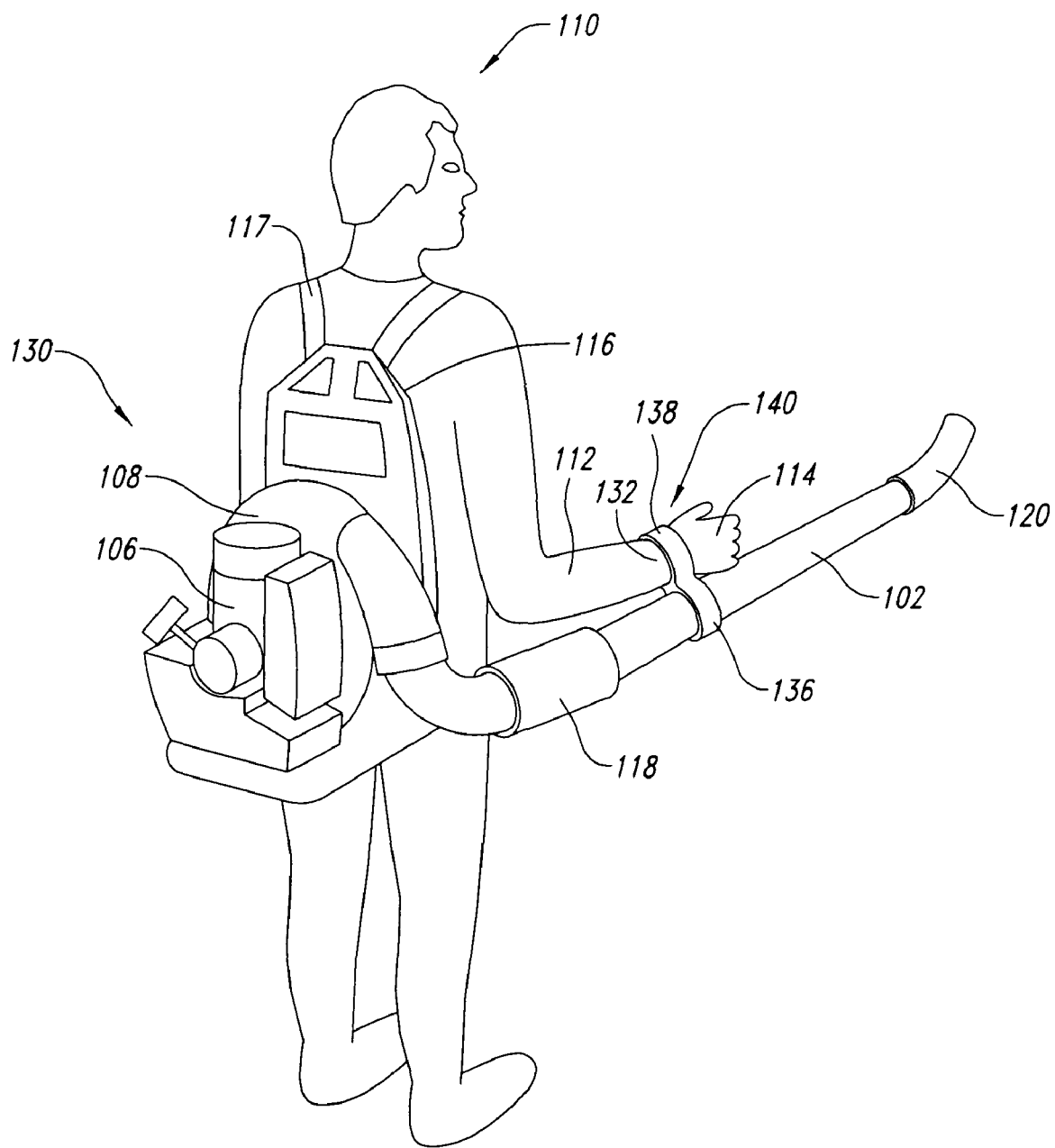
FIG. 2 shows an operator using a leaf blower according to one embodiment of the invention.

FIG. 2 illustrates a power tool according to an embodiment of the invention. Features shown in FIG. 2 that correspond to features of FIG. 1 are indicated by the same reference number.

A blower 130 includes a motor 106 and an impeller fan 108 mounted on a backpack frame 116. The output of the fan 108 is coupled to one end of a flexible tubing section 118, the other end of which is coupled to a rigid tubing section 102. The rigid tubing section may be in a single piece or may comprise several short sections coupled together. A nozzle 120 is attached to the extreme end of the rigid section 102. According to some embodiments of the invention, the blower 130 may include a handle (not shown) coupled to the rigid tube 102. Such a handle may additionally include a throttle control and a shut off switch for the motor 106 of the blower 130.

According to an embodiment of the invention, a strap 140 is attached to the rigid tubing section 102. The strap 140 comprises two loops. A first loop 136 is positioned around a portion of the rigid tubing section 102, while the second loop 138 is positioned around a user's wrist 132.

Figure 3:
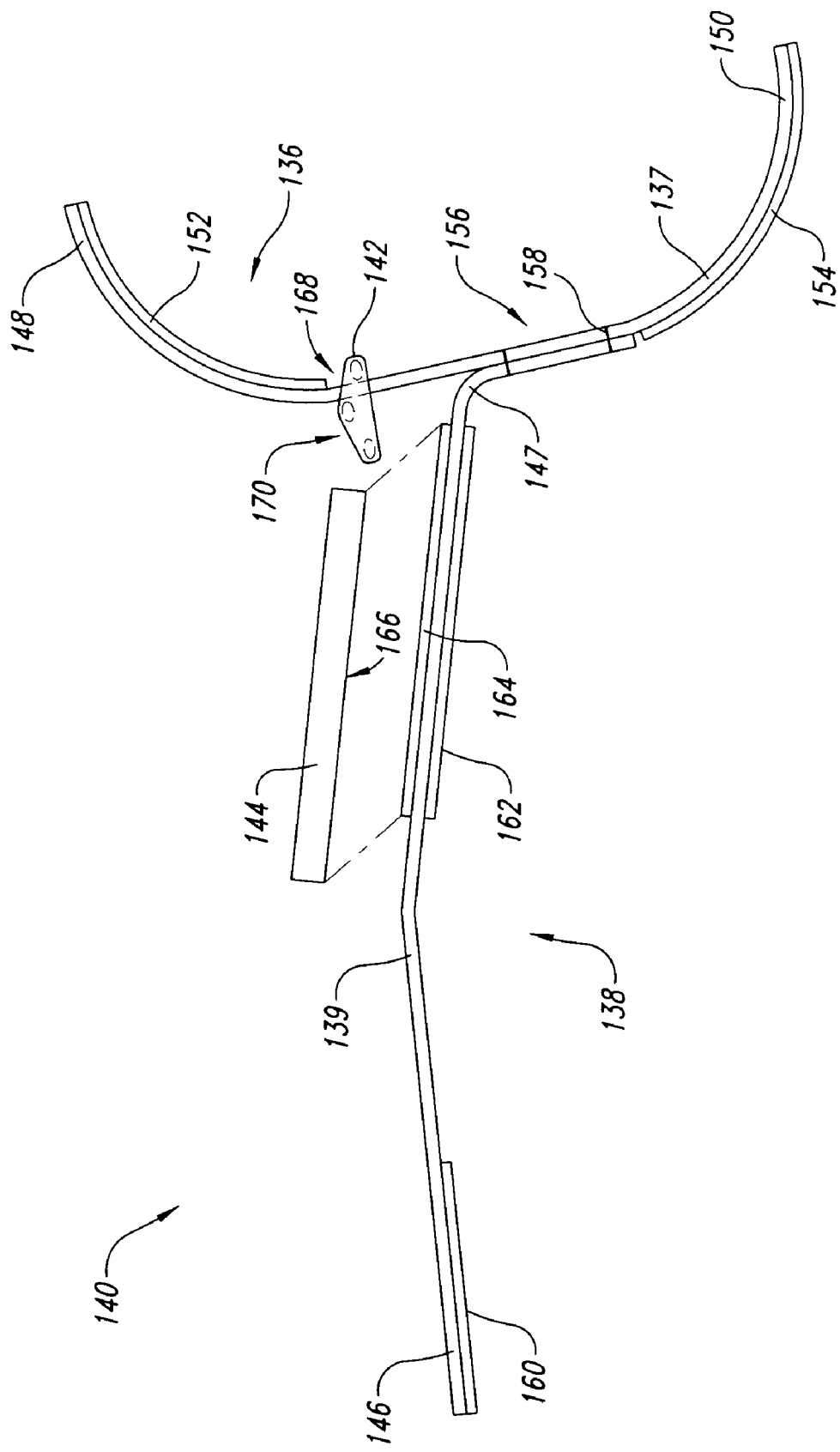
FIG. 3 shows a strap according to an embodiment of the invention.
Figure 4:
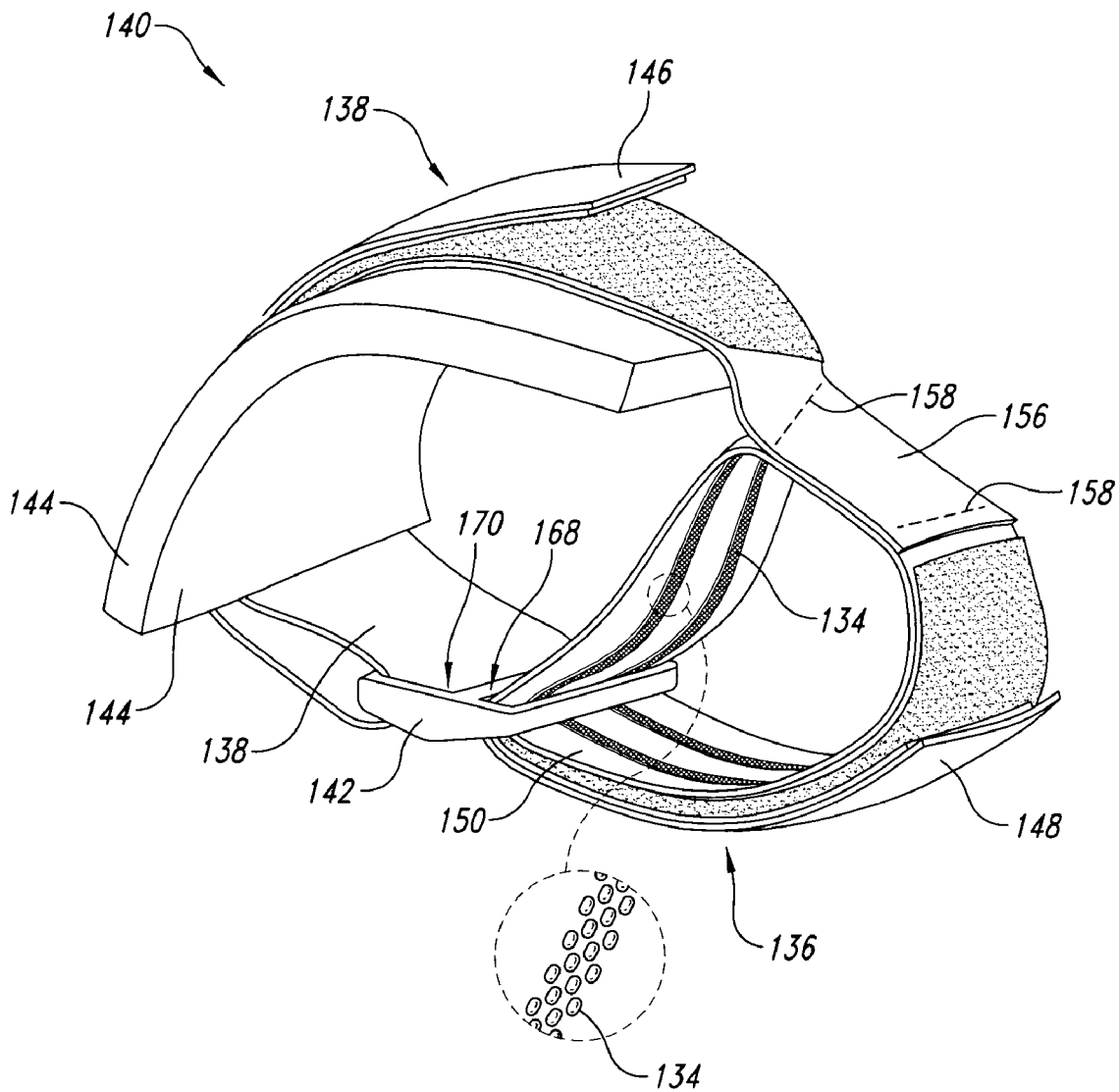
FIG. 4 shows the strap of FIG. 3 assembled for use.

FIGS. 3 and 4 illustrate the strap 140 according to an embodiment of the invention. The strap 140 includes a first loop 136 and a second loop 138. According to a preferred embodiment, the first and second loops 136, 138 are made from first and second lengths 137, 139 of webbing of a synthetic material such as nylon. The first loop 136 includes one or more elastomeric members 134 affixed to an inner surface of the first loop 136. The elastomeric members 134 may be in the form of a synthetic or natural rubber line or thread interwoven into the fabric of the first length 137 of webbing material, such that a large portion of the synthetic rubber threads is exposed on the inner surface of the loop 136. The first length 137 includes hook and loop fasteners 152, 154 affixed to first and second ends 148, 150 thereof, respectively. The first and second hook and loop fasteners 152, 154 are positioned on the first length 137 such that the first and second ends 148, 150 of the first length 137 may be adjustably joined together to close the first loop 136. The first length 137 also includes a buckle 142 having first and second apertures 168, 170. The first length 137 is threaded through the first aperture 168 of the buckle 142.

The second loop 138 is formed by the second length 139 of webbing material. A first end 147 of the second length 139 is affixed to the first length 137 at a point 156 in a region between the first and second ends 148, 150 thereof. According to the embodiment illustrated in FIGS. 3 and 4, the first end 147 of the second length 139 is affixed to the first length 137 by one or more rows of stitches 158. As shown in FIG. 4, according to this embodiment of the invention the row of stitches 158 closest to the opening of the second loop 138 is positioned at an angle across the width of the webbing material forming the loop 138. This provides a loop 138 having a tapered diameter, which enhances the comfort of the loop 138 when worn by the user, as will be described later. A hook and loop fastener 160 is affixed to a second end 146 of the second length 139. Hook and loop fasteners 162, 164 are affixed on opposing sides of the first end 147 of the second length 139 adjacent to where the first end 147 of the second length 139 is affixed to the first length 137. The second length 139 is configured to be folded back on itself, with the hook and loop fastener 160 contacting the hook and loop fastener 162.

A resilient member 144 includes a hook and loop surface 166 configured to couple with the hook and loop fastener 164 of the second length 139. The resilient member may be formed of a material such as synthetic sponge or some other material having a high degree of resiliency.

The term "hook and loop fastener" has been used in the description without reference to which type, hook or loop, is used. It will be recognized that the selection of hook or loop is a matter of comfort, convenience, or preference, and thus, one of ordinary skill in the art will have little difficultly in deciding which to use. Moreover, various other known releasable fasteners could be employed without departing from the invention.

In operation, the strap 140 is positioned adjacent to the rigid tube 102 of a blower 130 with the smaller diameter side of the second loop 136 facing the operator 110. The first length 137 of webbing material is wrapped snugly around the rigid tube 102 with the hook and loop fastener 152 contacting the hook and loop fastener 154 to close the loop 136. The elastomeric surface 134 is brought into contact with the rigid tube 102, which serves to prevent the first loop from sliding along the rigid tube.

The operator places the backpack frame 116 on his back, with the straps 117 across his shoulders. The operator then places his forearm 12 in a comfortable position approximately parallel to the rigid tube 102, with his wrist 132 adjacent to the strap 140. The second length 139 of webbing material is threaded through the second aperture 170 of the buckle 142, thereby closing the second loop 138, with the resilient member 144 affixed to an inner surface thereof. The operator 110 places his wrist 132 within the second loop 138, then draws the second end 146 of the second length 139 away from the buckle 142, which draws the second loop 138 comfortably around the wrist 132 of the operator 110. The second end 146 of the length 139 is folded back on itself until the hook and loop fastener 160 comes in contact with the hook and loop fastener 162, trapping the buckle 142 in the bight formed by folding the second end 146 of the second length 139.

The tapered shape of the second loop 136 accommodates the operator's wrist 132 where the wrist 132 widens at the base of the operator's hand 114, permitting a snug, comfortable fit.

With the strap 140 securely coupled to the rigid tube 102 of the blower 130 and the wrist 132 of the operator 110, the operator can easily control the position of the tube 102 and the nozzle 120 without undue exertion. The operator may lightly grip a handle if such is provided, or may rest his hand 114 lightly against the tube 102. Fatigue to the operator is greatly reduced over known devices, since the operator 110 can control the position of the tube 102 and nozzle 120 without the use of the small muscles in the lower forearm and wrist. Instead, the operator uses the larger muscles of the upper forearm, upper arm, and shoulder, to control the blower.

The strap 140 attenuates vibrations passing from the rigid tube 102 to the operator 110. Additionally, the resilient member 144 further dampens vibrations to further reduce the vibrational coupling between the blower 130 and the user 110.

Prior to development of the present invention, the inventor had experienced early and intermediate symptoms of vibration syndrome. During a period of development and testing of the invention, the symptoms significantly diminished, in spite of the fact that the inventor continued to operate vibrating power tools at approximately the same rate as previously.

The invention has been described with reference to a strap having two loops coupled together using a buckle and hook, and loop closures. It will be recognized that the strap may be formed using a wide variety of materials, including leather, various synthetic and natural fibers, and other materials. The strap may include tensioning means such as elastic panels. Additionally, the strap may include alternative means of coupling such as buckles, ties, snaps, or clips. The embodiment described herein includes an elastomeric surface to provide a firm grip between the first loop 136 and the rigid tube 102 of the blower. It will be recognized that other means for providing such a grip may be used, or in some applications may not be necessary. Accordingly, variations in configuration and materials fall within the scope of the invention.

The embodiment described with reference to FIGS. 2-4 includes a strap having first and second loops. According to another embodiment of the invention, the power tool is provided with a coupling device such as a buckle, clip, or flange, configured to couple to the strap. In such a case, the strap may include only a single loop configured to attach to the user's arm. The strap may also include a coupling device configured to mate with that of the power tool.

The strap has been described for use with a leaf blower. It will be recognized that such a strap may be useful in the operation of many types and varieties of power tools. For example, the strap may be used in conjunction with other landscaping tools such as grass trimmers, brush cutters, and vacuums. Additionally, the strap may be used in conjunction with tools of other industries, such as pressure washers, grinders, sanders, and other power tools. In some applications, the strap may be used in conjunction with handles or other devices for control of a power tool, in which case the strap will serve to provide relief to an operator from constant muscle tension and force on the handle of the tool, thus reducing the overall effects of fatigue and vibration syndrome.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A power tool system, comprising:
   a blower including:
      a blower motor;
      a blower fan coupled to the motor and configured to be driven thereby; and
      a section of tubing operatively coupled to the fan, through which the fan is configured to drive a stream of air;
   a support assembly, including:
      a buckle;
      a blower strap positioned around the section of tubing, the blower strap having first and second ends, the first end extending through a first side of the buckle and coupled to the second end to form an adjustable first loop; and
   a wrist strap having a first end attached to the blower strap at a point in a middle region of the blower strap, and a second end configured to pass through a second side of the buckle and couple to itself to form a second loop in a position to be attachable to a user's wrist while the blower is being carried by the user.

2. The power tool system of claim 1 wherein the wrist strap is attached to the blower strap by stitching.

3. The power tool system of claim 1 wherein first and second ends of the blower strap are held in engagement with each other by hook-and-loop surfaces attached to respective ends of the blower strap.

4. The power tool system of claim 1 wherein the wrist strap is sized and configured to be adjustably attached to the user's wrist.

5. The power tool system of claim 1 wherein the wrist strap includes hook-and-loop fasteners.

6. The power tool system of claim 1 wherein the blower comprises a backpack frame to which the motor is coupled and by which the user can carry the blower.

7. The power tool system of claim 1 wherein the motor is a gasoline powered engine.

8. The power tool system of claim 1 wherein the blower strap is formed from a webbing material including a plurality of elastomeric threads interwoven into the webbing material, portions of the elastomeric threads extending to an outer surface of the blower strap and making physical contact with the section of tubing.

9. The power tool system of claim 1 wherein the wrist strap comprises a vibration-damping element.

10. The power tool system of claim 9 wherein the vibration-damping element is coupled to a surface of the wrist strap and is formed from a material having a high degree of resiliency.

* * * * *